(12) United States Patent
Vieri et al.

(10) Patent No.: US 7,649,877 B2
(45) Date of Patent: Jan. 19, 2010

(54) MOBILE DEVICE FOR SENDING TEXT MESSAGES

(75) Inventors: Riccardo Vieri, Montespertoli (IT); Flavio Vieri, Montespertoli (IT)

(73) Assignee: Braintexter, Inc, Austin, TX (US)

( * ) Notice: Subject to any disclaimer, the term of this patent is extended or adjusted under 35 U.S.C. 154(b) by 0 days.

(21) Appl. No.: 11/858,775

(22) Filed: Sep. 20, 2007

(65) Prior Publication Data

US 2008/0051120 A1   Feb. 28, 2008

Related U.S. Application Data

(63) Continuation of application No. 10/491,797, filed as application No. PCT/IT02/00673 on Oct. 21, 2002, now Pat. No. 7,310,329.

(30) Foreign Application Priority Data

Oct. 22, 2001   (IT)   ............... FI2001A0199

(51) Int. Cl.
*H04L 12/66* (2006.01)
*H04M 1/64* (2006.01)
*H04M 11/00* (2006.01)

(52) U.S. Cl. ............... 370/352; 455/414.4; 455/466; 379/88.14; 379/88.17; 379/100.09

(58) Field of Classification Search ......... 370/352–356; 379/88.13, 88.16, 88.18, 88.22, 88.23, 88.24; 455/466, 412.2; 702/8, 260, E13
See application file for complete search history.

(56) References Cited

U.S. PATENT DOCUMENTS

| | | | |
|---|---|---|---|
| 4,615,081 A * | 10/1986 | Lindahl | .................. 24/90.1 |
| 5,950,123 A | 9/1999 | Schwelb et al. | |
| 5,995,590 A | 11/1999 | Brunet et al. | |
| 6,163,809 A * | 12/2000 | Buckley | .................. 709/237 |
| 6,351,522 B1 * | 2/2002 | Vitikainen | .................. 379/67.1 |

(Continued)

FOREIGN PATENT DOCUMENTS

EP   0 946 032 A3   9/1999

(Continued)

OTHER PUBLICATIONS

Rossfrank, "Konstenlose Sprachmitteilungins Festnetz", Dec. 10, 2000, 4 pages, Germany.

(Continued)

*Primary Examiner*—Binh K Tieu
(74) *Attorney, Agent, or Firm*—Toler Law Group

(57) ABSTRACT

A mobile device includes a display device, a modem interface to communicate with a network, an input interface to receive data, and processing logic responsive to the input interface. The mobile device also includes a memory accessible to the processing logic. The memory includes a plurality of instructions executable by the processing logic to provide a user interface to the display device. The user interface includes a first area to receive a text message and a second area to receive an identifier associated with an addressee device. The memory also includes instructions executable by the processing logic to receive the text message and to submit the text message for conversion into an audio message and for transmission of the audio message to the addressee destination device.

21 Claims, 5 Drawing Sheets

U.S. PATENT DOCUMENTS

| | | | |
|---|---|---|---|
| 6,389,114 | B1 | 5/2002 | Dowens et al. |
| 6,421,707 | B1 | 7/2002 | Miller et al. |
| 6,456,616 | B1 | 9/2002 | Rantanen |
| 6,529,592 | B1 | 3/2003 | Khan |
| 6,603,837 | B1 | 8/2003 | Kesanupalli et al. |
| 6,757,365 | B1 | 6/2004 | Bogard |
| 6,760,412 | B1 * | 7/2004 | Loucks ............... 379/88.13 |
| 6,763,089 | B2 | 7/2004 | Feigenbaum |
| 6,790,704 | B2 | 9/2004 | Doyle et al. |
| 6,792,086 | B1 | 9/2004 | Saylor et al. |
| 6,801,604 | B2 | 10/2004 | Maes et al. |
| 6,816,578 | B1 | 11/2004 | Kredo et al. |
| 6,895,084 | B1 | 5/2005 | Saylor et al. |
| 6,907,112 | B1 | 6/2005 | Guedalia et al. |
| 6,931,255 | B2 | 8/2005 | Mekuria |
| 6,934,756 | B2 | 8/2005 | Maes |
| 7,024,460 | B2 * | 4/2006 | Koopmas et al. ............ 709/206 |
| 7,027,568 | B1 * | 4/2006 | Simpson et al. ......... 379/88.16 |
| 7,054,419 | B2 * | 5/2006 | Culliss ................. 379/88.22 |
| 7,065,185 | B1 | 6/2006 | Koch |
| 7,092,370 | B2 | 8/2006 | Jiang et al. |
| 7,095,733 | B1 | 8/2006 | Yarlagadda et al. |
| 7,113,803 | B2 | 9/2006 | Dehlin |
| 7,174,297 | B2 | 2/2007 | Guerra et al. |
| 7,310,329 | B2 | 12/2007 | Vieri et al. |
| 2002/0120697 | A1 * | 8/2002 | Generous et al. ............ 709/206 |
| 2003/0028380 | A1 * | 2/2003 | Freeland et al. ............ 704/260 |
| 2004/0186777 | A1 | 9/2004 | Margiloff et al. |
| 2004/0208302 | A1 | 10/2004 | Urban et al. |
| 2005/0033771 | A1 | 2/2005 | Schmitter et al. |
| 2005/0136949 | A1 | 6/2005 | Barnes, Jr. |
| 2007/0121846 | A1 | 5/2007 | Altberg et al. |
| 2007/0130014 | A1 | 6/2007 | Altberg et al. |
| 2007/0162296 | A1 | 7/2007 | Altberg et al. |
| 2008/0010355 | A1 | 1/2008 | Vieri et al. |

FOREIGN PATENT DOCUMENTS

| | | |
|---|---|---|
| JP | 2000134407 | 5/2000 |
| WO | 00/19697 A1 | 4/2000 |
| WO | 2005/003920 A2 | 1/2005 |

OTHER PUBLICATIONS

U.S. Appl. No. 12/018,889, entitled "System to Generate and Set Up an Advertising Campaign Based on the Insertion of Advertising Messages Within an Exchange of Messages, and Method to Operate Said System," filed Jan. 24, 2008, by Riccardo Vieri.

U.S. Appl. No. 12/206,864, entitled "Systems and Methods of Contextual Advertising," (Vieri) filed Sep. 9, 2008.

* cited by examiner

Select the addressee the help call is directed to. Leave your telephone number in order to receive possible communications.

Addressee No.  police113

Sender No.  064554

WRITE YOUR MESSAGE and make it heard on any telephone in the world!

I am a dumb boy. I'm alone at home and I'm afraid that burglars are inside. Help me, I'm at 15, via Rossi in Florence.

Enter

*FIG. 4A*

Enter the telephone number you want to send the message to: Leave also your telephone number in order to receive possible communications.

Addressee No.  05514234

Sender No.  3351411

WRITE YOUR MESSAGE and make it heard on any telephone in the world!

Hi, I'm Rossi Marco, I read your ad and I'm interested in the job you offer. I would like to work with you. The e-mail address found on the web is wrong and I'm abroad at the moment. Could you please contact me at the number 351411

Enter

*FIG. 4B*

| Enter the nickname of the person you want to send the message. Leave your nickname in order to receive possible communications. Select the language you want the message to be heard in.<br><br>Addressee No. [  ] Misscuba<br><br>Sender No. [  ] Italia12<br><br>Language [  ] inglese | WRITE YOUR MESSAGE and make it heard on any telephone in the world!<br><br>Hi I am an Italian boy and I live in Florence. Would you like to visit me next summer? My nickname is Italia 12.<br><br>Enter |
|---|---|

FIG. 4C

| Enter the telephone number you want to send the message to: Leave also your telephone number in order to receive possible communications.<br><br>Addressee No. [  ] 065434<br><br>Sender No. [  ] 064554 | WRITE YOUR MESSAGE and make it heard on any telephone in the world!<br><br>Hello Monica. I know you're at home, I'm late and I've finished the money on my telephone card. I'll come for you at nine. See you later. Adriano.<br><br>Enter |
|---|---|

FIG. 4D

MOBILE DEVICE FOR SENDING TEXT MESSAGES

CLAIM OF PRIORITY

This application is a Continuation Patent Application of and claims priority from U.S. patent application Ser. No. 10/491,797, entitled "SYSTEM FOR SENDING TEXT MESSAGES CONVERTED INTO SPEECH THROUGH AN INTERNET CONNECTION TO A TELEPHONE AND METHOD FOR RUNNING IT", filed on Apr. 6, 2004, now U.S. Pat. No. 7,310,329 which claims priority from PCT application PCT/IT02/00673 filed on Oct. 21, 2002, which claims priority from Italian Patent Application No. FI01A000199, filed on Oct. 22, 2001, each of which is incorporated herein by reference in its entirety.

TECHNICAL FIELD

This disclosure relates to the technical sector of electronics and particularly to communication systems.

BACKGROUND

Different systems use the Internet as a means of transferring data, but such systems are typically not capable of sending text messages from the Internet and converting them into vocal messages on a telephone line.

By means of an IP connection it is possible to download songs, to telephone, to send e-mail messages, and to send SMS messages.

The most common peripheral unit, available for everyone, to be connected to the Internet is the modem. This word is a mixture of two words, modulator and demodulator. The function of a modem is to convert digital data in the form of electric pulses into a form that can be used for transmission on normal telephone lines. Therefore, the modem converts electric signals coming from the computer into sounds and permits their transmission by means of the telephone line. The receiving modem makes the opposite operation: as soon as it receives the sounds from the telephone line, it reconverts them into electric signals in order to make them available to the computer it is connected to. This further operation is called demodulation. Technical evolutions of modems include new peripheral units and digital platforms that send data on a suitably shaped line without any need to convert them into sounds, such as ISDN data transmitting cards. Another resource available to users is the DSL connection. Using this system it is possible to divide the vocal transmission from the data transmission by using particular filters.

Also referring to Internet connections, another available technology for users is the system of connection by satellites. Thanks to these systems even people who are not experts at hardware and software can surf on the Internet, send e-mail messages, send SMS messages, and send and receive fax and other related operations. By means of data transmitting cards, permitting the transmission of complex data in audio and even video forms, also called technological platforms, many companies develop more and more complex programs and applications in order to provide firms with ancillary services.

One of the easiest ways to send communications with a telephone, using the Internet, is writing SMS messages. For this purpose, the user fills in a form on the web writing a text message and sends it to a server/gateway that transfers it to the mobile number the message is directed to.

However, this means of communication has some drawbacks. SMS messages are short and the communication reaches almost exclusively the users of the country where the portal works. In addition, these SMS messages reach neither cordless phones not using the GSM system nor common house telephones. The communication that reaches the final destination is mainly textual, in the form of a message that can be read on a display, not vocal. Another important characteristic is that users cannot verify immediately the result of the SMS message sent on-line.

"Text-to-speech" (TTS) technology exists, which permits some interactions via internet/telephone. By these means, an Internet/telephone service where TTS is in use allows a service subscriber to receive a notification that a message has arrived on the phone or a notification to dial a telephone number and listen to the message in the form of speech. Nevertheless, this system is not convenient, as it needs registrations, and is limited and not easy to be used by an inexpert user. The TTS technology principally reads text and converts the text to speech. TTS technology has been useful for teaching, utility and support purposes, in particular for those who are disabled and blind, but as regards to its use with telephone interactions, it is mostly based on "inbound" applications, i.e., centered in order to support inbound and not outbound communications. Vocal tree menus are an example and are used by companies in order to automatically provide a caller with information.

Other systems permitting communication by voice with another user via the Internet also exist. But with the traditional methods, people holding a single telephone line cannot communicate by voice in a simple and comfortable way through the computer with another telephone. In fact, in order to make a call using the Internet, the user needs software, loudspeakers and microphones. An Internet user is not able to send text messages to the designated telephones, except for the messages appearing on the display of the phone.

Also, e-mails, the most widespread means of communication via the web, cannot give guaranties about the correct receipt of the communication by the addressee. As a matter of fact, a simple automatic acknowledge transmission of the e-mail by the addressee to the sender is not sufficient to say he/she has entirely read the communication or understood its meaning.

BRIEF DESCRIPTION OF THE DRAWINGS

The present disclosure may be better understood, and its numerous features and advantages made apparent to those skilled in the art by referencing the accompanying drawings.

FIG. 4A illustrates a display that may be used to send an emergency message.

FIG. 4B illustrates a display that may be used to send a job related message.

FIG. 4C illustrates a display that may be used to send a message to a new fiend.

FIG. 4D illustrates a display that may be used to communicate.

DETAILED DESCRIPTION OF THE DRAWINGS

Figure 1:
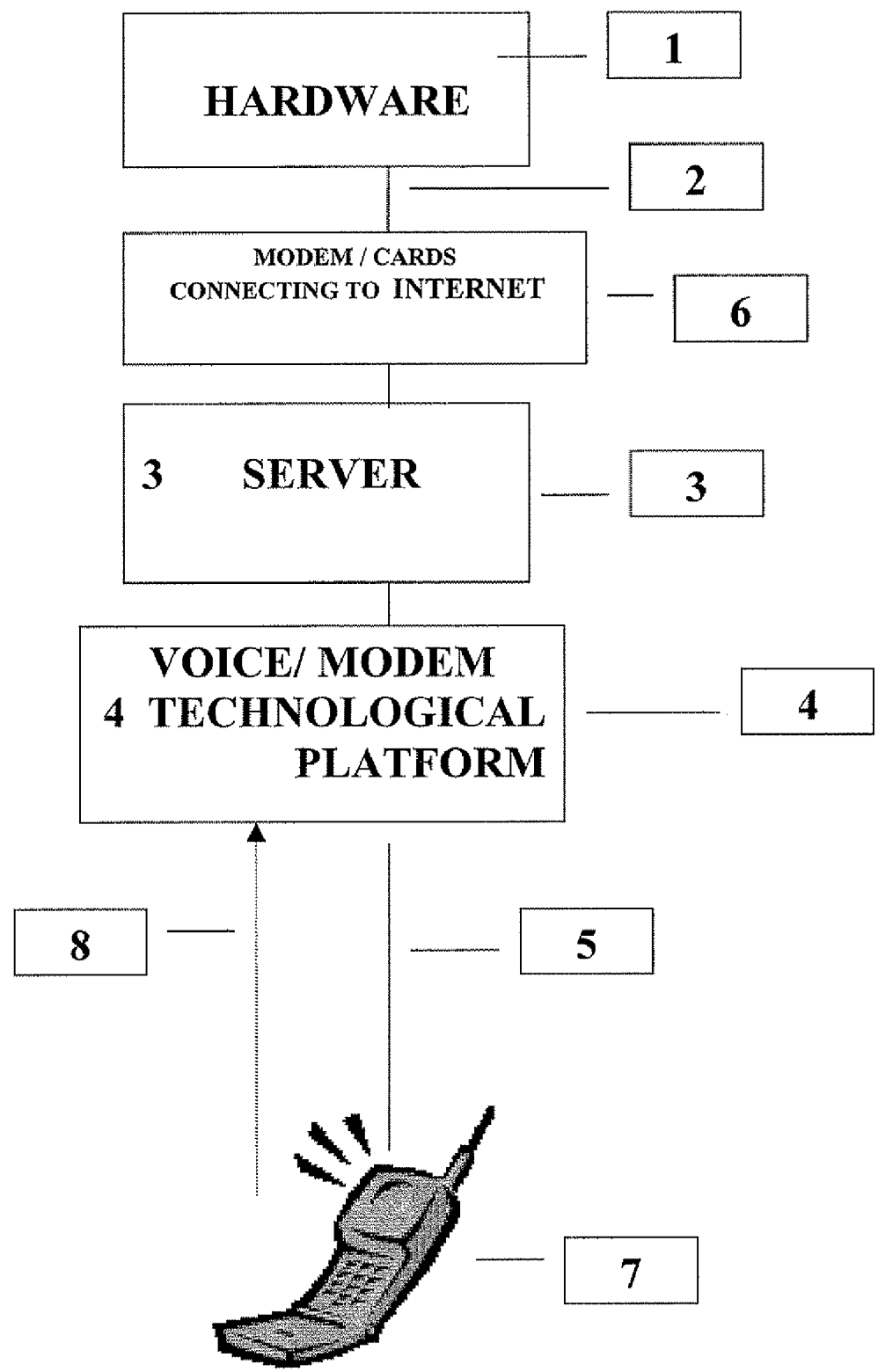
FIG. 1 is a general diagram that illustrates elements of a communication system.

FIG. 1 shows a system that includes hardware (1), used by the user for writing messages and sending them; a connection to Internet (2), by a modem (6) or ISDN connecting card, net card or alternative systems connecting to Internet; a server (3) where a software is installed, directing the various functions and changes text messages into speech, sending them by means of voice modem and/or technological platforms for transmitting vocal data (4) by a telephone line (5) to a telephone (7) of the addressee of the communication. The addressee, if he wishes, can interact with the vocal message received by using a keyboard or a keypad associated with the telephone (7) or by speaking into the telephone. This possible interaction will be sent (8) on the server and filed for the sender who can then read and/or listen to it.

The text written by a user, by an IP connection, gets to a server, where it is converted into speech and sent to a telephone number by a telephone line. The entire executing process is then saved on a file that can be read by means of an IP connection. This system involves hardware, data transmission systems, telephone lines, specialized software, receiving apparatus and many technical details.

Figure 2:
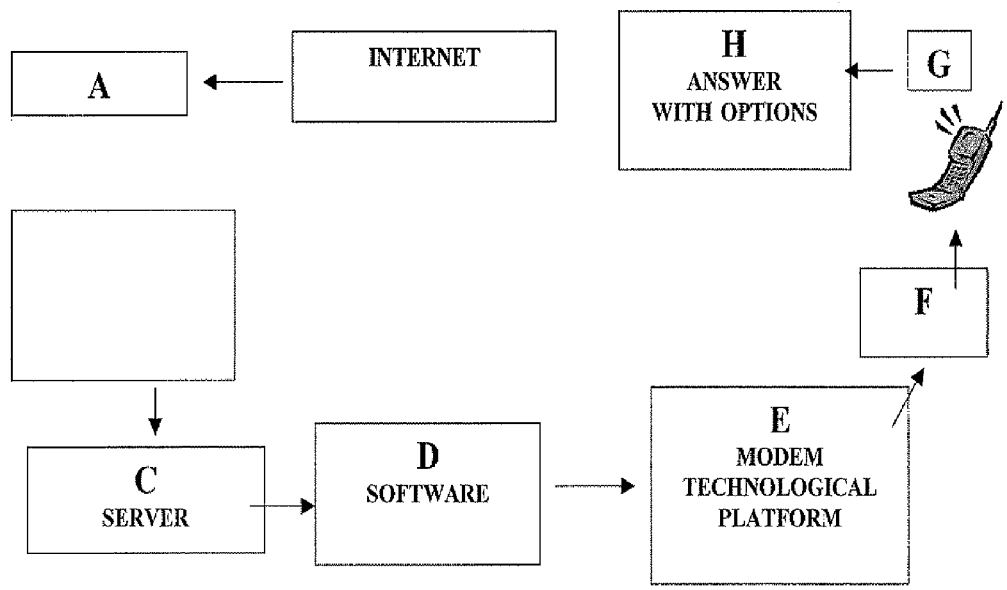
FIG. 2 is a general diagram that illustrates operation of the system of FIG. 1.

Referring to FIG. 2, a flowchart shows the steps of the system in the case that the user uses a form found on the Internet. On a web page, the user can find a form to write text. This form may contain several details. The user writes a message (B) and presses enter to send the message to the server (C). The server receives the message, encodes it using software (D), such as a "voice engine", and changes the text into speech using text-to-speech (TTS) technology. The telephone number of the addressee is received by the software that is configured to send the communication by means of a peripheral, such as a voice modem and/or a technological platform (E). The peripheral sends the message to the addressee by a normal telephone line (F). The addressee receives the communication, which was originally sent in the form of text and then converted into speech. In addition, the addressee (G) can interact with the caller, using the keyboard, by the DTMF system or directly via the microphone of the telephone. So doing, he can answer questions and/or send communications that will be saved in log files available for data analysis and decoding.

Figure 3:
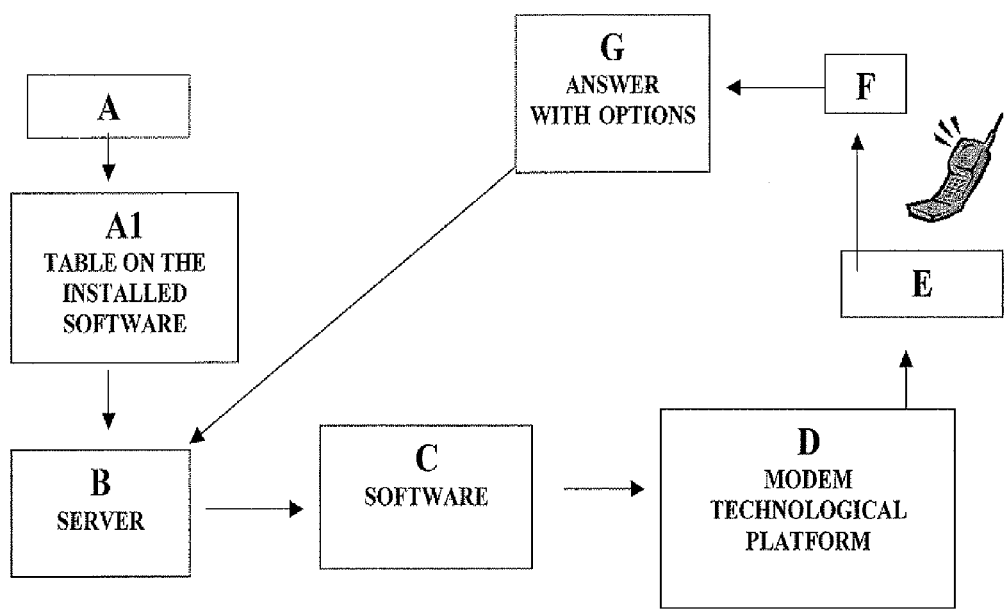
FIG. 3 is a general diagram that illustrates operation of the system of FIG. 1.

Referring to FIG. 3, a flowchart briefly shows the action of the Internet user in the case that he has downloaded software to run the system. The Internet surfer (A) writes the message (A1) directly into a table of the software installed on his/her hardware, without using a form on-line as in the previous case. The communication starts and gets to the web server (B) that records it. The software (C) changes the text into speech and, by means of a voice modem (D) and/or other data transmitting/receiving cards, sends it to the designated number by a telephone line (E). The communication reaches the addressee's telephone (F). The addressee has the possibility of answering with various options (G). For this system, the surfer uses software specifically provided, connects to the Internet, writes a message via the software interface, sends it to a web server, which converts it into speech by means of sophisticated software, and sends the communication to the addressee. By means of the software, the user can also send pre-recorded communications filed at the server.

FIGS. 4A, 4B, 4C, 4D schematically show how the user can write a message and send it. In particular, they describe some practical examples. In these examples, it is possible to send and/or receive the communication to and/or from an alias as well as to a telephone number. Additionally, it is possible to send/or receive the communication in a desired language. In particular, FIG. 4A shows the system used for social utility or emergency cases; FIG. 4B shows the system used to look for a job; FIG. 4C shows the system used to look for new friends; FIG. 4D shows the system for everyday use. These illustrated examples are simply practical examples but are not to be considered restrictive.

Figure 5:
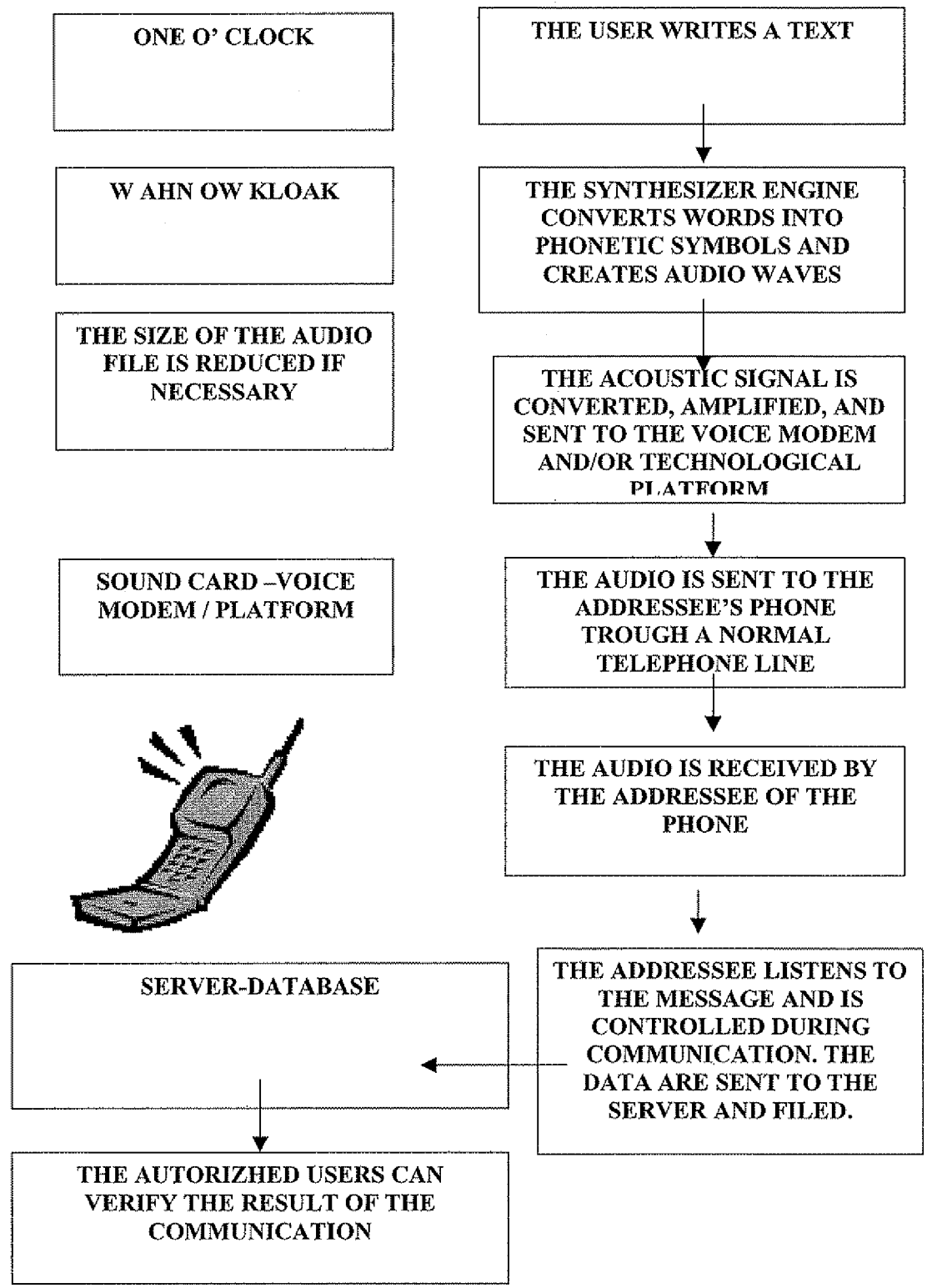
FIG. 5 is a general flow diagram to illustrate a method of communicating.

FIG. 5 is a flowchart that describes a system showing how the text-to-speech (TTS) technology works in a particular case. Using TTS technology, words and text are fragmented into phonemes and are analyzed by characters, figures, sums, inflections and punctuation. The final result is an audio form.

The system and method of the present disclosure allows Internet surfers, or more generally users that have a modem and/or even a more developed analog or digital card transmitting and receiving data, to be able to write a text on a form found on the web site and/or by means of an interface downloaded from software, to send this message to a telephone number and make it known to the addressee in real time and/or by pre-recording. This system also constitutes a valid alternative to communicate vocally with another person with a single telephone line simply by writing a text, with no need of loudspeakers and microphones or subscriptions to services permitting calling via the Internet.

This disclosure aims at transmitting on a common telephone vocal messages obtained by the conversion of text messages written by the user and sent via the Internet.

In a particular embodiment, a system of the present disclosure involves use of hardware and software devices, telematic instruments and systems for the transmission of data, which together allow the receipt of a vocal message sent originally by the Internet in the form of text.

In a particular embodiment, the system for sending text messages converted into speech comprises: means to write and send messages, by a data input device including hardware showing a table where users can write a text message and/or order the transmission of a pre-recorded message, indicate the telephone number(s) of the addressee or a database where addressees telephone numbers can be found, and send it to a server; means to connect the data input device with the server, including a connection to the Internet by modem, data transmitting and receiving cards, similar apparatus or kits for satellite connection; means to receive and process the text message, by the server, where a program is installed that is able to convert the text message into a vocal message and set it up for transmission on the phone, and comprising other applications capable of controlling and filing the data relative to the entire telephone transaction; means to transmit the vocal message on the telephone line by a voice modem or other technological peripherals for the transmission of at least vocal data; and means to receive the message, including a common phone.

Conveniently, it is possible to reply to the vocal messages received by means of a suitable keyboard connected to the phone using DTMF keys and tones. Conveniently, the addressee can send a reply vocal message to the sender, so that it is then filed on the server.

Conveniently, on the computer through which data is input, software is installed, which permits the transmission of text messages by modem, or otherwise. The computer can also include digital and/or analog cards for transmitting and receiving pre-recorded communications. The software program installed by the user may be represented by an icon within the browser, in case the user is surfing on the Internet or is not using it at that particular moment.

Conveniently, on the computer through which data is input, there is a table, either created by installed software or an HTML form or similar form, which comprises a suitable interface used to write a message and send the message to the server carrying out the transaction until the message reaches its destination. By this interface, the user can write many messages to various people and send them by means of an automatic connection to the Internet.

The table is also used to send pre-recorded communications loaded on an external server to various addressees and at specific hours.

Conveniently, the table through which messages are written includes an area for an optional input of the sender's telephone number or his/her "alias" or nickname.

Conveniently, the table through which messages are written includes an area for the necessary input of the addressee's telephone number or his/her "alias" or nickname.

Conveniently, the table through which messages are written includes an area for the input of the language the user wants to use to send the message to the designated telephone number. Conveniently, the table through which messages are written includes an area for the selection of the pre-recorded message to send.

The system permits the transmission from the web of both text and pre-recorded messages in different forms, thanks to a system for compressing and converting data. Nowadays, the transmission of pre-recorded messages for telemarketing campaigns and the conversion of the text into speech have some technical limits. Particularly recorded messages converted into files often take such wide dimensions that they are not easy to send to the addressee. In addition, the "voice engines", which are the engines that change the text into speech, cannot be easily used, as they need a computer background on operating systems and the small amount of information available cannot be easily understood by all users.

Conveniently, the audio messages registered in professional forms, as well as the text files for the conversion in audio using "text-to-speech" technology, are converted into smaller files and sent to the addressee simply using voice modems and not necessarily sophisticated data transmitting cards. As a matter of fact, files that are too large would not allow the telephone message to be transmitted immediately. The user on the phone could wait several minutes before receiving the communication and could hang up. The larger the file to send is, the longer the wait may be. The system of the present disclosure avoids this drawback thanks to particular technical solutions: first, inserting an initial immediate "beep", starting when the receiver is connected, which allows the addressee to hear a signal and hold it waiting, in case he needs less time to listen to the communication; second, converting the forms into automatically smaller files, thanks to a particular system for the compression of audio files, which makes them in an average mono quality, sufficient for the reception level of the phone; and third, is the possibility to insert at the beginning of the call a "confirmation file", i.e., an acknowledge vocal message, which causes the user to interact with the telephone keyboard for listening or declining the arriving communication.

Conveniently, the text communication can be addressed to an "alias" and not to a particular telephone number. The server will be able to identify the alias and connect the communication to a specific telephone number, providing the privacy of the users.

This system also allows all users, under authorization, to use the most applications and functions available, thanks to the database on the web server. An Internet user, with his/her password, will be able to send various communications to various addressees, simply by indicating the required preferences.

Conveniently, the server holds a file archive with a database and multiple support that allows authorized users to import files with telephone numbers, write a text or retrieve pre-recorded messages, record them in a different audio form, send them to the addressees, and file everything on the server database, all using a simple connection to the Internet, without particular programs or the help of experts in this field.

Conveniently, the users will be able to write simple messages and send them with synthesized voices and possibly real voices and with an image, chosen among figures at pleasure, like robots, actors, singers, football players and other. With a simple photo and a nickname of the addressee, it is possible to send him/her a communication on the phone without knowing his/her number, and also relations between foreign companies might develop thanks to the possibility of a translator that converts the text into the desired language and sends it to the addressee. Anyone that has difficulties in speaking will have a new means of communication. People can talk together saving time and money, because operational and telephone costs will be covered by sponsors and advertising. New jobs related to services, information and public utility will be created.

Conveniently, the table through which messages are written includes an area for the insertion of the time and date to send the message.

Conveniently, the table through which messages are written includes an area for the selection of the tone of voice to use to send the message. Conveniently, the table through which messages are written includes an area for the selection of the transmission and/or reception of the messages to several telephone numbers.

Conveniently, the table through which messages are written includes an area for the selection of an automatic repeat of the number, in case the number called is engaged and/or free but without answer, choosing how many calls to try.

Conveniently, the table through which messages are written includes an area permitting to decide that in case there is an answering machine and/or a call transfer, the message can be transmitted anyway.

Conveniently, the user can send and/or receive the communication anywhere and to any telephone number. Conveniently, this system allows the user to receive an acknowledgement of the receiving message by e-mail or a message on the phone.

Conveniently, this system permits monitoring of every call made by the user, and the relative results are filed, so that the user can later verify and check the history of the message. Conveniently, the user has a password in order to send and/or receive the communication and is authorized to send and/or receive the communication as the server automatically detects it.

Conveniently, the user is authorized by an identification system to use the database and the functions of the system found on the web server and, thanks to the program installed on the server, can import data onto his hardware, input them on the server database, make operations in order to send messages to several addressees, select pre-recorded messages, select options, times and dates, and file and save data on the server.

Conveniently, the data transmission for the outbound calls is not performed via cable, but through an analog or digital telephone line.

Conveniently, this system permits a user to send and/or receive communications in real time and/or pre-recorded messages filed on the server in such a form suitable to be received by the addressee.

With regards to the reception, the addressee of the message can interact through telephone, using the keyboard or answering the message by voice. The server registers the answers and/or interactions left by the addressee, so that the sender, by means of a specific interface, can connect to the server, decode the meaning of the DTMF tones and/or listen to the vocal messages left by the addressee.

Conveniently, writing a text inside a banner and/or form, the user can send and/or receive a pre-recorded communication with the initial and/or final addition of the written text converted into speech.

Conveniently, an acoustic signal is transmitted as soon as there is a telephone connection with the addressee, avoiding immediate disconnection in case of a brief waiting period before the transmission of the communication.

Conveniently, if the transmitting file is too large, it is automatically converted and reduced to such an extent that the addressee can correctly receive it.

A method to convert text messages into vocal messages and send them by telephone line is disclosed and is characterized in that it comprises the following steps: decoding of the text received by the user; conversion of the text into speech; extension of the size of the vocal file created; adjustment of the vocal message in such a form to be read by the data transmitting card; interaction with the transmitting card; dialing of the number(s) indicated; transmission of the message on the phone; recording of the data of the telephone call and filing of the data on a server database; and during conversion, compress the file if wider and not suitable for a perfect transmission.

This method creates more audio files that are arranged by number and sent, following the order of configuration, all together in the same telephone call, to allow the addressee to listen on the phone to several vocal messages arranged in order but included in a single call.

Conveniently, the first stage of conversion of words is called "standardization of the text", the second stage is the "standardization of the pronunciation", the third stage is the pronunciation itself that puts in order more phonemes. Specific algorithms are used in order to fragment words and find the sound produced by a specific letter. The last stage of this process is the "prosody", which is the speed of reading, with possible pauses and other details for the perfection of the audio. At this stage, the voice modem and/or a technological platform converts the text to voice.

The possibility to send long and wide text messages, later converted into vocal messages, to telephone numbers all around the world, permits a user to send easily and rapidly any kind of communication, no matter the length of the text. This operation can reduce costs and gives the sender a better assurance than previous systems, permitting a complete confirmation of the receipt by the addressee.

This acknowledgment is much more complete using the system of the present disclosure, which permits a user to check the complete or partial receipt of the communication, registering the opinions and interactions of the addressee. The system of the present disclosure has other advantages: for example, it allows people who have problems with communication, e.g., autistic, deaf and dumb, to communicate vocally on the phone with anyone without using their own voice, sending messages, help calls and other services by phone, so that the written text arrives to the addressee in the form of speech. Another application of this disclosure is to translate the text in any language by means of a simultaneous translator that changes the written text into the desired language and sends it to the addressee in the form of speech.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. Accordingly, the disclosure and the figures are to be regarded as illustrative rather than restrictive.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A mobile device comprising:
a display device;
a modem interface to communicate with a network;
an input interface to receive data;
processing logic responsive to the input interface; and
memory accessible to the processing logic, the memory comprising a plurality of instructions executable by the processing logic to:
provide a user interface to the display device, the user interface including a first area to receive a text message and a second area to receive an identifier associated with an addressee device;
receive the text message and the identifier;
submit the text message to a server for conversion into an audio message and for transmission of the audio message along with an acknowledge message to the addressee device associated with the identifier, wherein the acknowledge message permits the addressee device to accept delivery of the audio message or to decline delivery of the audio message;
receive a reply voice message from the server in response to the addressee device accepting delivery of the audio message;

provide a repeat input option via the user interface, the repeat input option to specify an option to automatically attempt one or more additional transmissions in response to the addressee device not accepting or declining delivery of the audio message.

2. The mobile device of claim 1, further comprising instructions executable by the processing logic to receive a confirmation that the audio message and the acknowledge message were sent to the addressee device.

3. The mobile device of claim 1, wherein the second area is adapted to receive multiple identifiers and wherein the audio message and the acknowledge message are transmitted to multiple destination devices associated with the multiple identifiers.

4. The mobile device of claim 1, wherein the text message comprises a short message service message.

5. The mobile device of claim 1, further comprising a transceiver to transmit and receive data via one of an Internet Protocol (IP) connection, an analog connection, and a digital connection.

6. The mobile device of claim 1, wherein the input interface comprises a telephone keypad.

7. A method comprising:
receiving, at a server, an input from a mobile device, the input comprising a text message and one or more destination addresses;
converting the text message into a voice message;
transmitting the voice message along with an acknowledge message from the server to the one or more destination addresses, wherein the acknowledge message permits a destination device to accept delivery of the voice message or to decline delivery of the voice message;
receiving, at the server, a reply voice message from the destination device in response to the destination device accepting delivery of the voice message; and
automatically attempting one or more additional transmissions in response to the destination device not accepting or declining delivery of the voice message.

8. The method of claim 7, wherein the input further comprises scheduling data, and wherein the voice message and the acknowledge message are transmitted at a time according to the scheduling data.

9. The method of claim 7, wherein the input further comprises a language identifier specifying a language to which the text message is to be translated, and wherein the method further comprises translating the text message from a first language to a second language before the text message is converted into the voice message.

10. The method of claim 7, wherein the server includes voice to text conversion capability, and wherein the input further comprises schedule data including a date, a time, or any combination thereof.

11. The method of claim 7, further comprising transmitting an email message from the server to a device, wherein the email message includes the reply voice message.

12. A method comprising:
providing a user interface to a display device of a mobile device, the user interface including a first area to receive a text message and a second area to receive an identifier associated with an addressee device;
receiving the text message and the identifier;
submitting the text message for conversion into an audio message and for transmission of the audio message and an acknowledge message to the addressee device associated with the identifier, wherein the acknowledge message permits the addressee device to accept delivery of the audio message or to decline delivery of the audio message;
receiving, at the mobile device, a reply voice message in response to the addressee device accepting delivery of the audio message; and
providing a repeat input option at the user interface, the repeat input option to specify an option to automatically attempt one or more additional transmissions in response to the addressee device not accepting or declining delivery of the audio message.

13. The method of claim 12, wherein the identifier comprises an alias related to one or more telephone numbers.

14. The method of claim 12, wherein the user interface further comprises a third area to receive a language indicator specifying a desired language, and wherein the text message is translated into the desired language before the text message is converted into the audio message.

15. The method of claim 14, wherein the user interface further comprises a fourth area to receive schedule data specifying when the audio message and the acknowledge message are to be sent.

16. The method of claim 12, wherein the user interface further comprises a selectable input to specify a tone of voice.

17. The method of claim 12, wherein the identifier comprises a telephone number, and wherein the second area is adapted to receive one or more telephone numbers.

18. The method of claim 12, wherein the user interface further comprises a banner interface area configured to receive a selection of a pre-recorded communication, and wherein the selected pre-recorded communication is sent with the audio message and the acknowledge message.

19. The method of claim 12, wherein the acknowledge message includes a vocal message requesting a telephone keyboard response from the addressee device, wherein the telephone keyboard response includes one of listen to the audio message and decline the audio message.

20. The method of claim 12, wherein the one or more additional transmissions are automatically attempted when the addressee device is engaged and does not answer a call attempting delivery of the audio message, and wherein the one or more additional transmissions are automatically attempted when the addressee device is free but does not answer the call attempting delivery of the audio message.

21. The method of claim 12, wherein the repeat input option provided at the user interface includes an option to select a number of calls to the addressee device attempting delivery of the audio message.

* * * * *

UNITED STATES PATENT AND TRADEMARK OFFICE
CERTIFICATE OF CORRECTION

PATENT NO.        : 7,649,877 B2                                              Page 1 of 1
APPLICATION NO.   : 11/858775
DATED             : January 19, 2010
INVENTOR(S)       : Riccardo Vieri et al.

It is certified that error appears in the above-identified patent and that said Letters Patent is hereby corrected as shown below:

On Sheet 5 of 5, Box No. 4, Right Hand Side, Figure 5, line 3, delete "TROUGH" and insert -- THROUGH --, therefor.

On Sheet 5 of 5, Box No. 6, Right Hand Side, Figure 5, line 1, delete "AUTORIZHED" and insert -- AUTHORIZED --, therefor.

In column 2, line 58, delete "fiend." and insert -- friend. --, therefor.

Signed and Sealed this
Twenty-ninth Day of November, 2011

David J. Kappos
*Director of the United States Patent and Trademark Office*